(12) United States Patent
Van Vleet

(10) Patent No.: US 12,070,011 B1
(45) Date of Patent: Aug. 27, 2024

(54) COLLAPSIBLE AND EXPANDABLE DOG KENNEL

(71) Applicant: Dennis Richard Van Vleet, Flower Mound, TX (US)

(72) Inventor: Dennis Richard Van Vleet, Flower Mound, TX (US)

( * ) Notice: Subject to any disclaimer, the term of this patent is extended or adjusted under 35 U.S.C. 154(b) by 119 days.

(21) Appl. No.: 17/727,037

(22) Filed: Apr. 22, 2022

Related U.S. Application Data

(60) Provisional application No. 63/178,442, filed on Apr. 22, 2021.

(51) Int. Cl.
*A01K 1/03* (2006.01)
*A01K 1/00* (2006.01)

(52) U.S. Cl.
CPC ............ *A01K 1/034* (2013.01); *A01K 1/0035* (2013.01)

(58) Field of Classification Search
CPC .... A01K 1/034; A01K 1/0035; A01K 1/0245; A01K 1/03; A01K 1/00; A01K 1/02; B65D 5/42; B65D 5/6626; B65D 5/321; B65D 5/322; B65D 5/6673
USPC .......................................................... 119/497
See application file for complete search history.

(56) References Cited

U.S. PATENT DOCUMENTS

| | | | | | |
|---|---|---|---|---|---|
| 3,773,017 | A | * | 11/1973 | Johannes | A01K 1/0245 119/453 |
| 4,903,637 | A | * | 2/1990 | Devault | A01K 1/033 119/497 |
| 5,931,120 | A | * | 8/1999 | Burns | A01K 1/0254 119/497 |
| 5,950,568 | A | * | 9/1999 | Axelrod | A01K 1/033 119/499 |
| 6,345,591 | B1 | * | 2/2002 | Richmond | A01K 1/0245 119/497 |
| 6,997,138 | B1 | * | 2/2006 | Simpson | A01K 1/033 217/122 |
| D623,242 | S | * | 9/2010 | Greer | D21/511 |
| 11,020,681 | B2 | * | 6/2021 | Rieber | F16C 11/04 |
| 2005/0145192 | A1 | * | 7/2005 | Axelrod | A01K 1/0245 119/499 |
| 2008/0245313 | A1 | * | 10/2008 | Jakubowski | A01K 1/0245 119/497 |
| 2010/0077961 | A1 | * | 4/2010 | Lipscomb | A01K 15/02 119/702 |
| 2010/0313822 | A1 | * | 12/2010 | Huang | A01K 1/034 119/474 |
| 2012/0227675 | A1 | * | 9/2012 | Link | A01K 1/0005 119/474 |
| 2014/0352628 | A1 | * | 12/2014 | Kellogg | A01K 1/033 119/497 |
| 2016/0073608 | A1 | * | 3/2016 | Huang | A01K 1/034 119/501 |

* cited by examiner

*Primary Examiner* — Brady W Frazier
*Assistant Examiner* — Zoe Tam Tran
(74) *Attorney, Agent, or Firm* — Jeffrey Roddy

(57) ABSTRACT

A collapsible and expandable dog kennel for providing a safe animal enclosure that saves space when not in use. The collapsible and expandable dog kennel generally includes top panels, side panels, a rear panel and a front panel. The kennel is rapidly mountable and dismountable to and from a vertical surface and thereby provides a secure and stable enclosure for an animal.

5 Claims, 14 Drawing Sheets

FIG. 16

COLLAPSIBLE AND EXPANDABLE DOG KENNEL

BACKGROUND OF THE INVENTION

The present invention relates generally to kennels and more specifically it relates to a collapsible dog kennel for providing a safe animal enclosure that saves space when not in use.

BRIEF SUMMARY OF THE INVENTION

The invention generally relates to a kennel which includes top panels, side panels, a rear panel and a front panel that are hingeably connected, biased to expand spontaneously from a collapsed secured position to an expanded secured position.

Before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting It would be desirable to provide a collapsible dog kennel for providing a safe animal enclosure that saves space when not in use.

It would be desirable is to provide a collapsible dog kennel that folds out of the way when not in use.

It would be desirable to provide a collapsible dog kennel that creates more open play area for off-leash pet care facilities while still providing safe individual spaces for animals during animal rest and feeding times.

It would be desirable to provide a collapsible dog kennel that provides extra temporary boarding space for pet care facilities when need exceeds permanent boarding space.

It would be desirable to provide a collapsible dog kennel that is self locking when expanded and inescapable by dogs.

It would be desirable to provide a collapsible dog kennel that locks securely out of the way in the collapsed position.

It would be desirable to provide a collapsible dog kennel that easily mounts into a wall track system without the use of tools.

It would be desirable to provide a collapsible dog kennel that is easily removable without the use of tools for thorough cleaning and sanitizing.

It would be desirable to provide a collapsible dog kennel that is well ventilated while prohibiting contact with neighboring animals.

It would be desirable to provide a collapsible dog kennel that has a built in meal preparation table.

One general example implementation of the present invention is a collapsible and modular dog kennel that easily mounts into a wall track/rail system without the use of tools; includes panels that are spontaneously biased to expand and automatically lock into the expanded state when the kennel is released from its collapsed state; a structure readily transitioned from an expanded state to securely fold away in a collapsed configuration for space saving; is readily removable from the wall track/rail system; and, is portable for ease of cleaning.

Other features, objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of this application.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 2A is a enlarged detail view of call-out (2A);

FIG. 16 shows a process for installing the collapsible kennel to a mounting track/rail which allows for side-by-side installation of multiple kennels.

Figure 1:
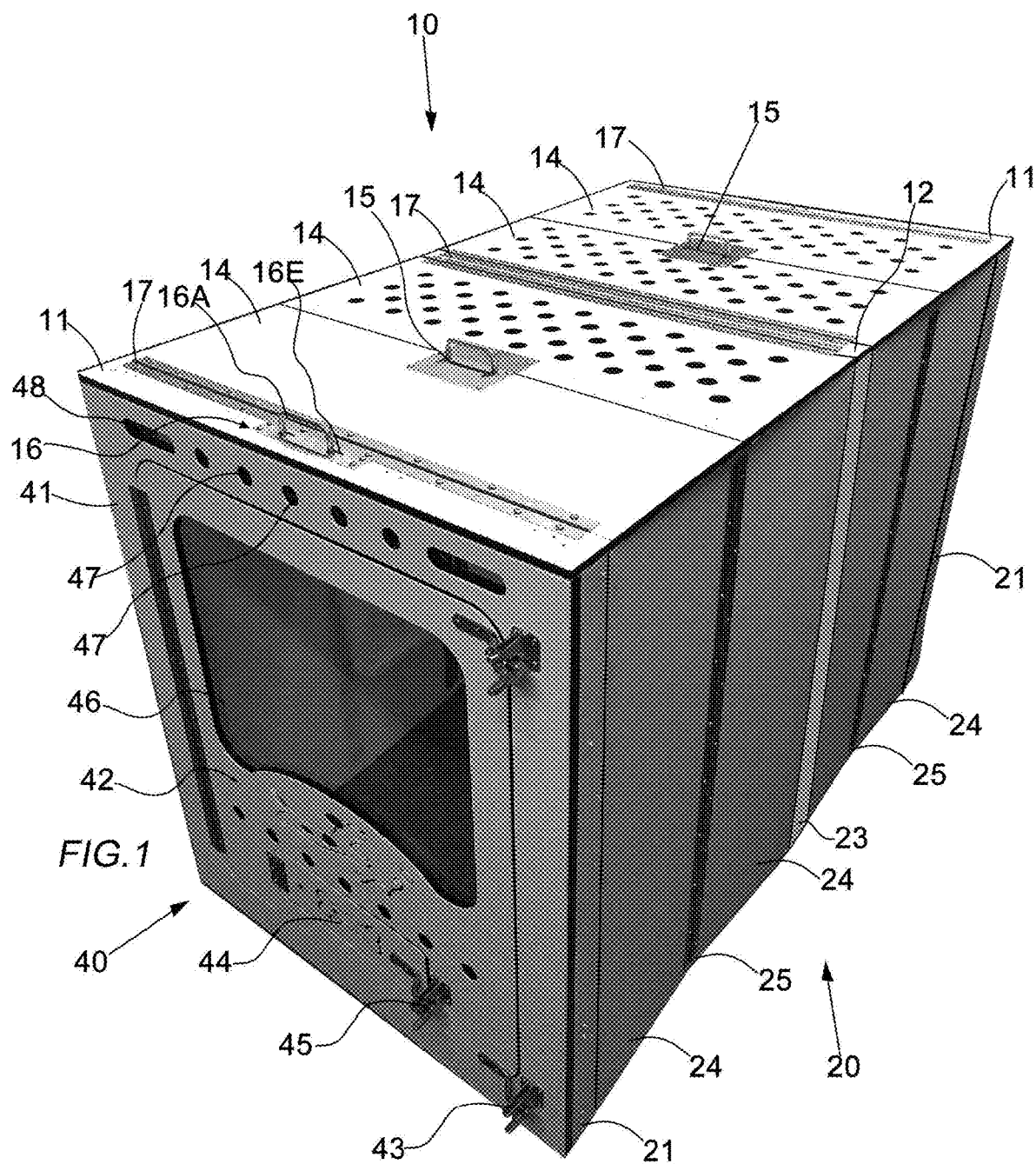
FIG. 1 is a front perspective view of an example collapsible kennel in a fully expanded configuration according to the present invention.
Figure 2:
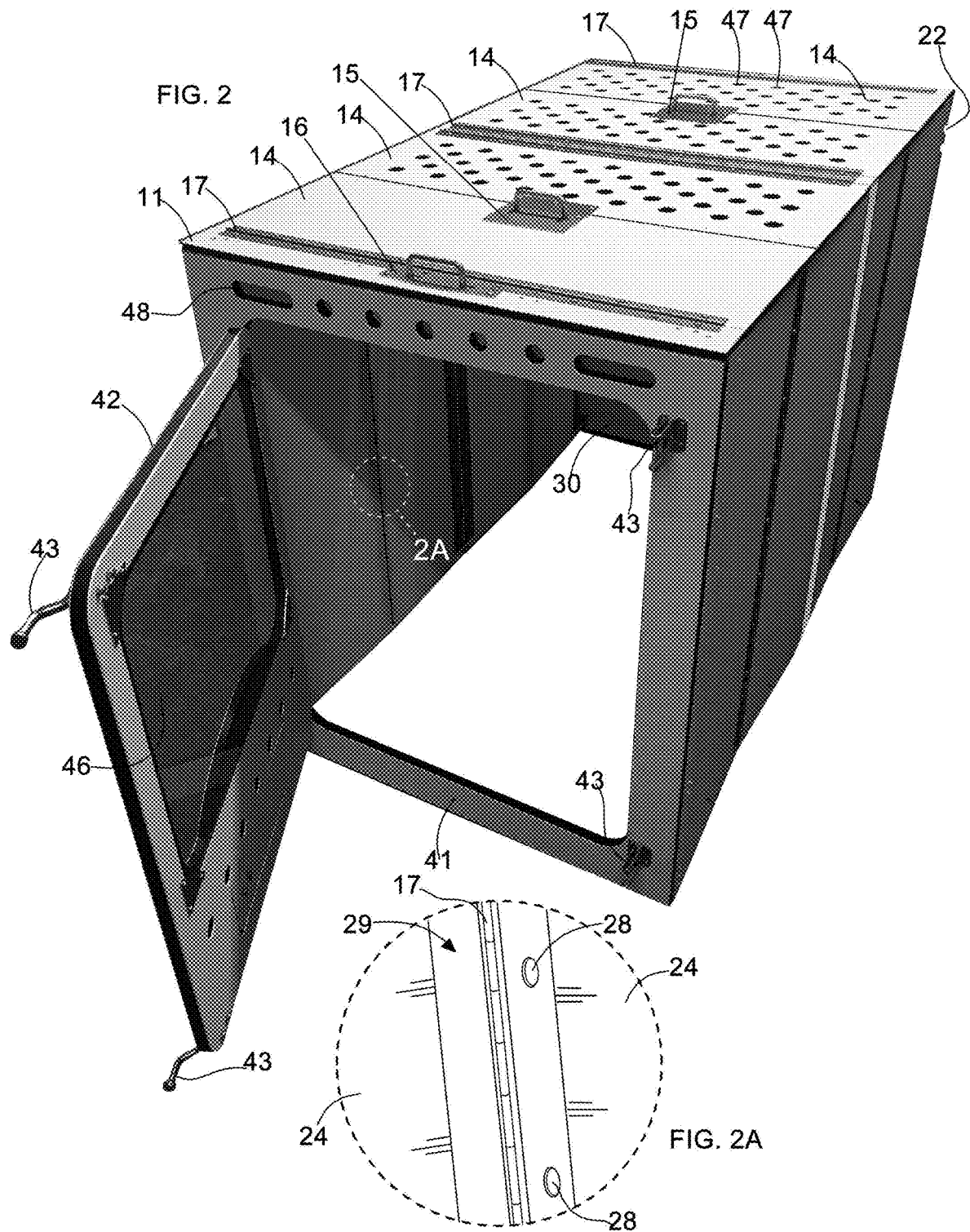
FIG. 2 is a front perspective view of the example collapsible kennel in a fully expanded configuration with a door in an open position.

REFERENCE LISTING TO THE NUMBERED ELEMENTS 10 top panel assembly
11 fixed top panel
12 floating top panels
14 movable top panels
15 top panel(s) lock
15A lock handle 15B plate
15C slot
15D slidable bolt(s)
15E recess
16 front lock
16A front handle
16B securing latch
16C securing pin
16D slot and sliding plate
16E guide plate
17 top hinge(s)
20 side panel assembly
21 fixed side panels
22 upper wall track mount
22A upper mounting rail
23 side panels
24 movable side panels
25 side hinge(s)
26 wheels
27 panel brace
28 bumper
29 panel hinge stile
30 rear panel
32 lower mounting bracket
40 front panel
41 front panel frame
42 front door
43 front door latch
44 feeding door
45 feeding door latch
46 window
47 ventilation holes
48 hand holds

DETAILED DESCRIPTION OF THE INVENTION

Figure 12:
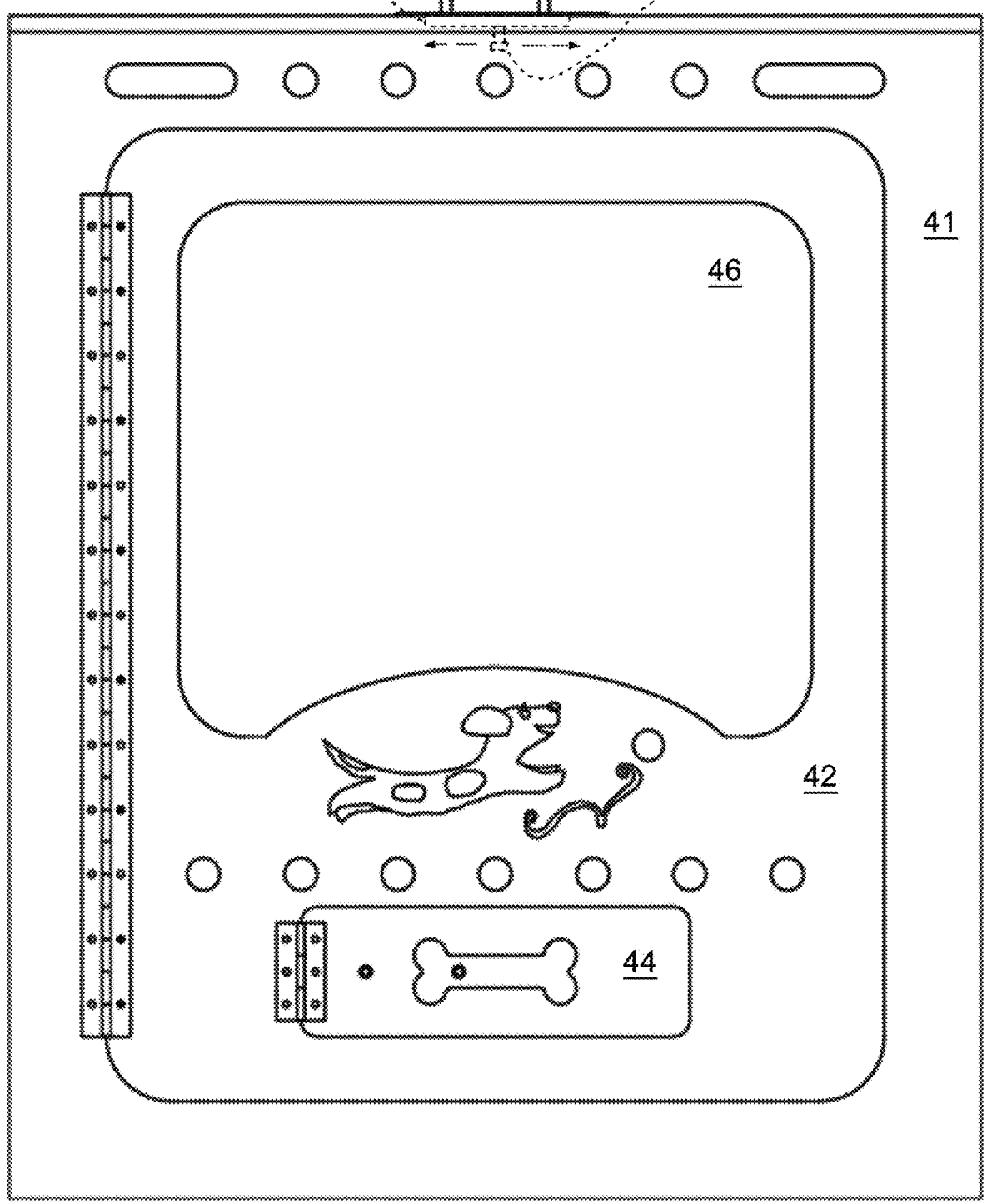
FIG. 12 is a front side view thereof showing a door (42) and inset feeding door (44)

Referring generally to FIGS. 1-16, in a general example implementation, a collapsible and expandable dog kennel includes a top side, a left side, a right side, a back side, a door and a food passageway. The top side, left side, right side and back side each include one or more hinged panels that are configured to fold outwardly or inwardly.
Description of the Top and Side Panels Top and side panels are comprised of movable (e.g., folding inwardly or outwardly), floating and fixed flat panels comprised of a pet safe material such as high density polypropylene or polyethylene and connected to form the top and sides of the a which cooperate to place the kennel in either a collapsed or expanded configuration. Top panel assembly (10) includes movable (14), fixed (11) and floating (12) panels that move relative to the fixed front (40) and rear (30) panels. Left and right side panel assemblies (20) include movable (24), fixed (21) and floating panels (23). The top and side panels may be ventilated or unventilated, and connected to one another by way of top hinge members (17) and side hinge members (25). While in the particular implementation shown, the hinge members (17, 25) are piano-type hinges, living hinges or other suitable hinge types will be appreciated by those having skill in the art having access to this disclosure. Movable top panels (14) are connected to fixed top panels (11) and a floating top panel (12) which is set between hinge members (17). Frontmost movable panel (14) is hingeably connected to front frame (41) via relatively narrow fixed panel (11) which is disposed between the front frame (41) and the frontmost movable panel (14). Mounted to the fixed top panel (11) is a front lock (16) with a spring loaded handle (16A) that is slidable within a slot (16D) by which pin (16C) is slidably actuated (FIGS. 12, 14, 15), for engagement with latch (16B) in order to secure the kennel in the fully collapsed configuration or release it therefrom. Pushing the kennel from the front side panel (40), collapses it, driving latch (16B) which displaces spring loaded pin (16C) into the notch at the tapered end of the latch and secures the kennel in the collapsed position. Spring loaded extended position locks (15) with handles (15A) are mounted at the borders between the top panels (14) and include adjacent plates (15B) which are mounted opposite one another and bridge hinges (17), (FIG. 4). When the kennel is the fully extended position, spring loaded slidable bolts (15D) extend into recesses (15E) and beneath the adjacent plates (15B) securing the adjacent plates (15B) in an abutting position. Retraction of the bolts (15D) is accomplished by moving spring loaded handle (15A), disengaging bolts (15D) from recesses (15E), and allowing the panels to hingeably move with respect to one another which permits the entire construction to collapse in accordion-like fashion.

Figure 3:
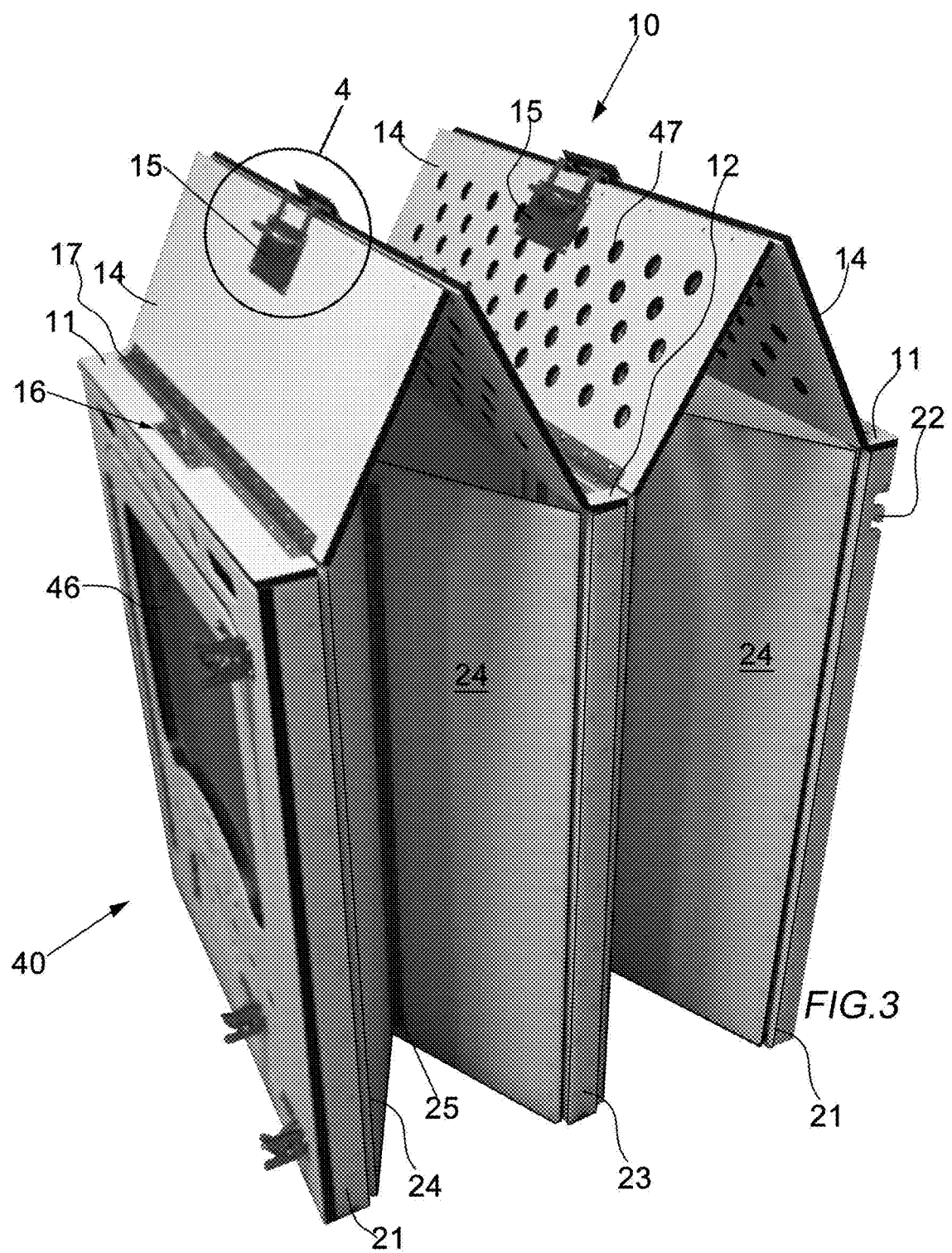
FIG. 3 is a front perspective view of the example collapsible kennel in a transitional position.
Figure 4:
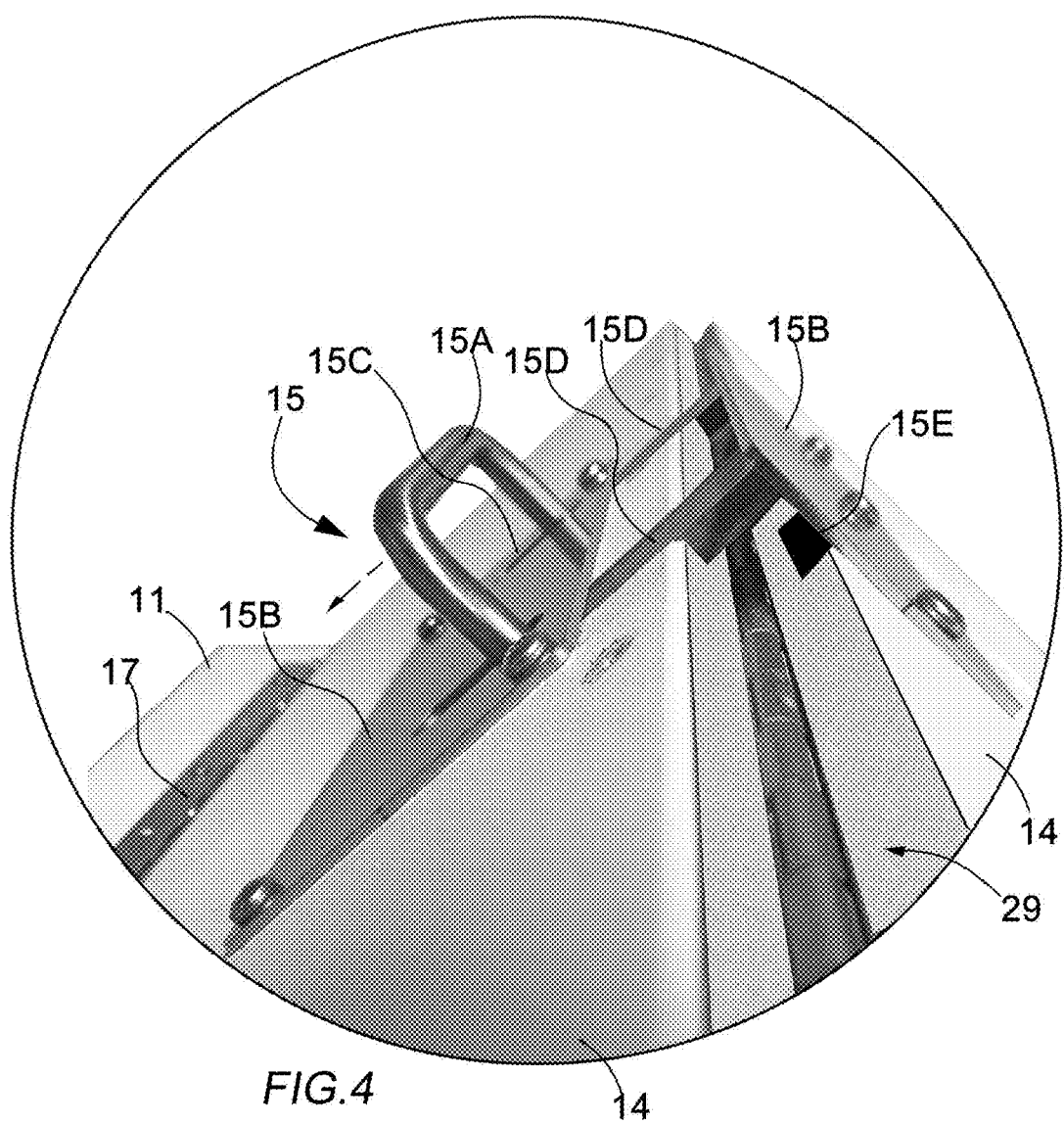
FIG. 4 is an enlarged detail view of call-out (4) shown in (FIG. 3) of a top panel locking mechanism in an unsecured position.
Figure 6:
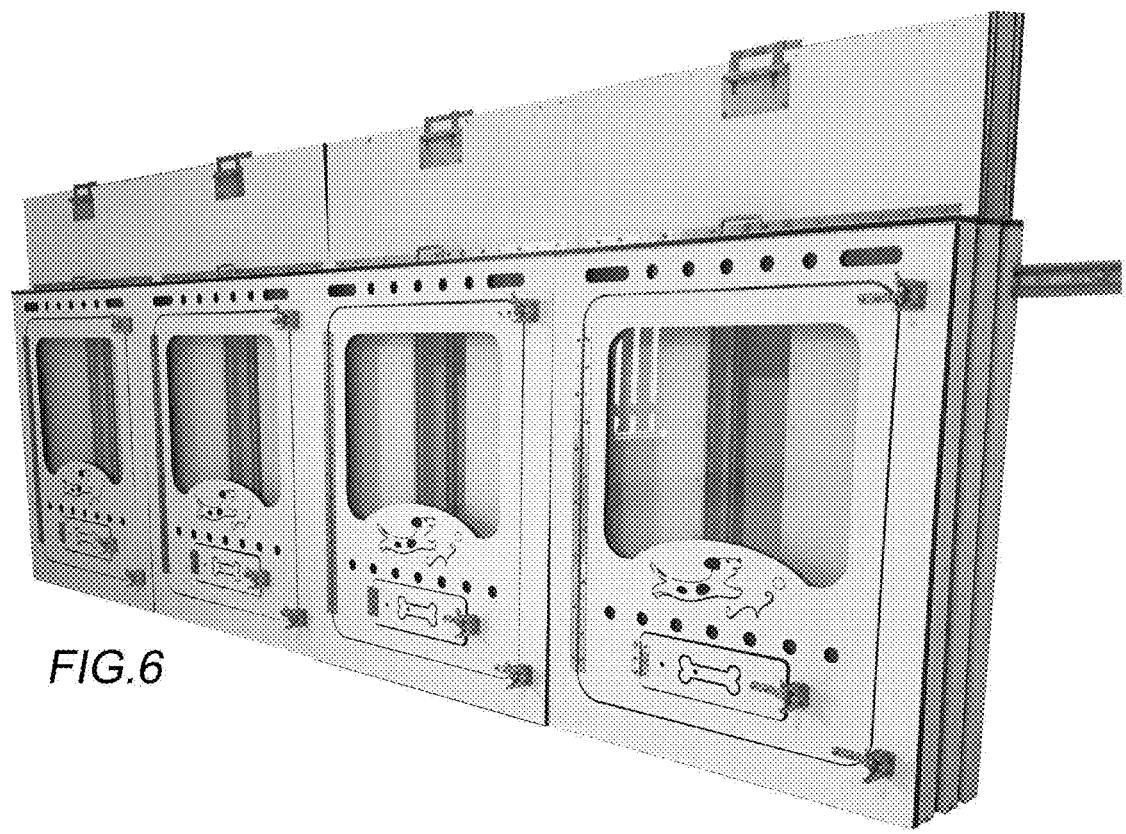
FIG. 6 shows a bank of multiple collapsible kennels mounted side-by-side to an adjacent vertical surface.
Figure 7:
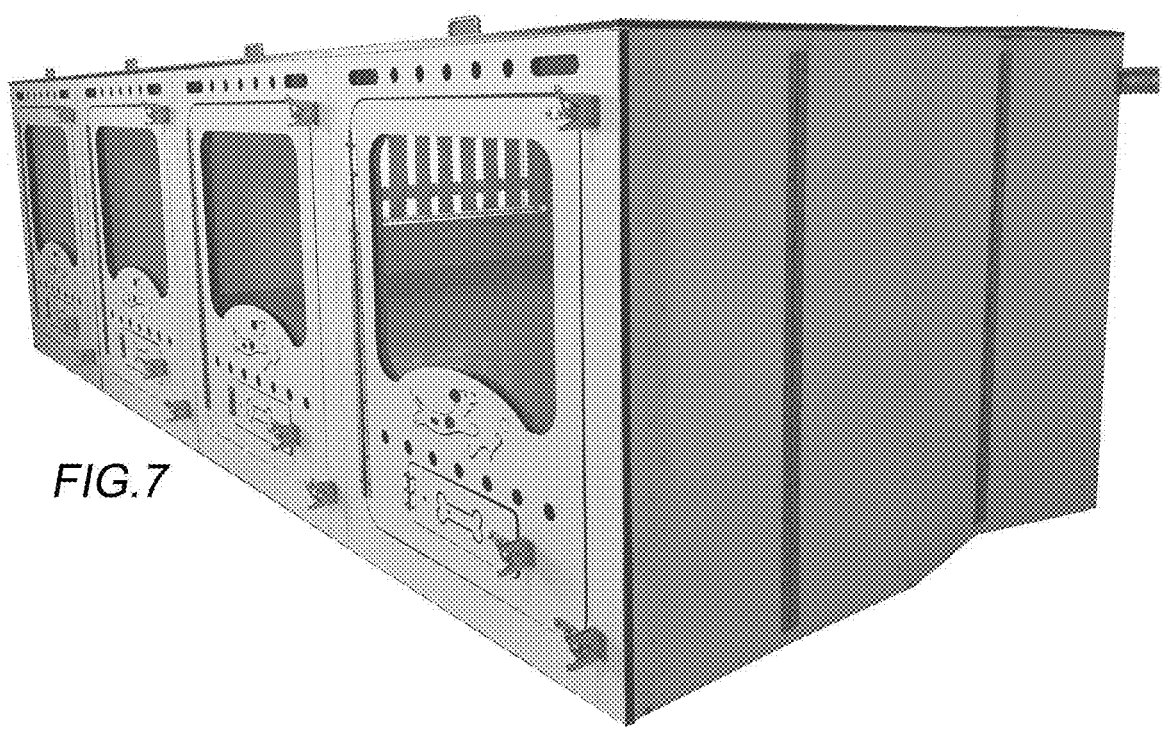
FIG. 7 shows the bank of multiple collapsible kennels shown in (FIG. 6) in a fully expanded configuration.
Figure 8:
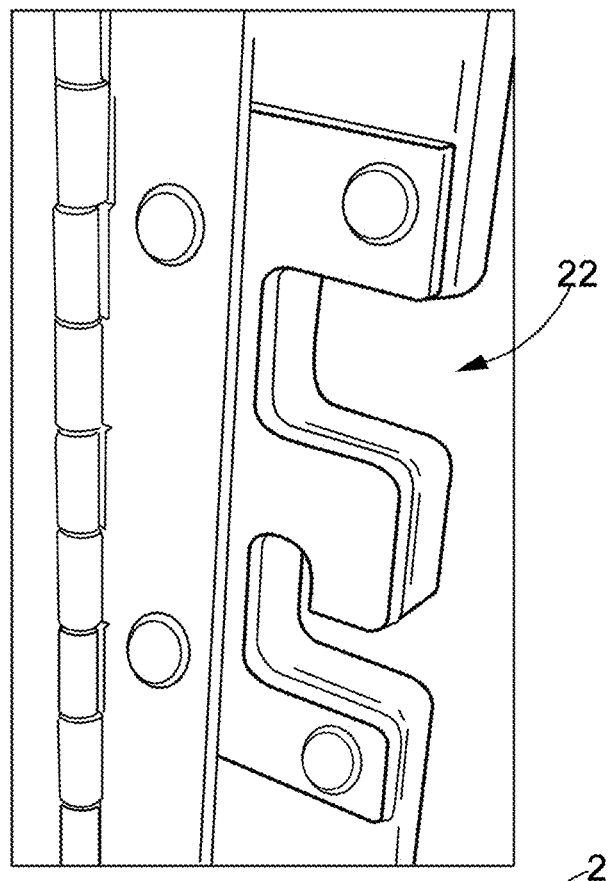
FIG. 8 is an enlarged partial detailed view of an upper track mount (22) (see also FIGS. 3, 5) formed at a back side of the collapsible kennel.
Figure 9:
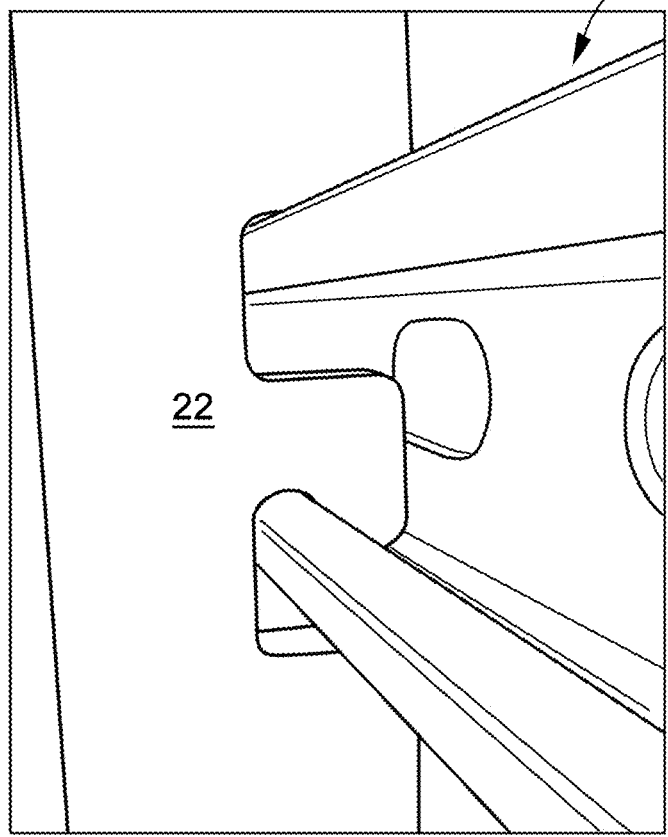
FIG. 9 is an enlarged partial view of the upper track mount (22) engaged with a mounting track/rail (22A) that may be attached to a vertical surface such as a wall.
Figure 10:
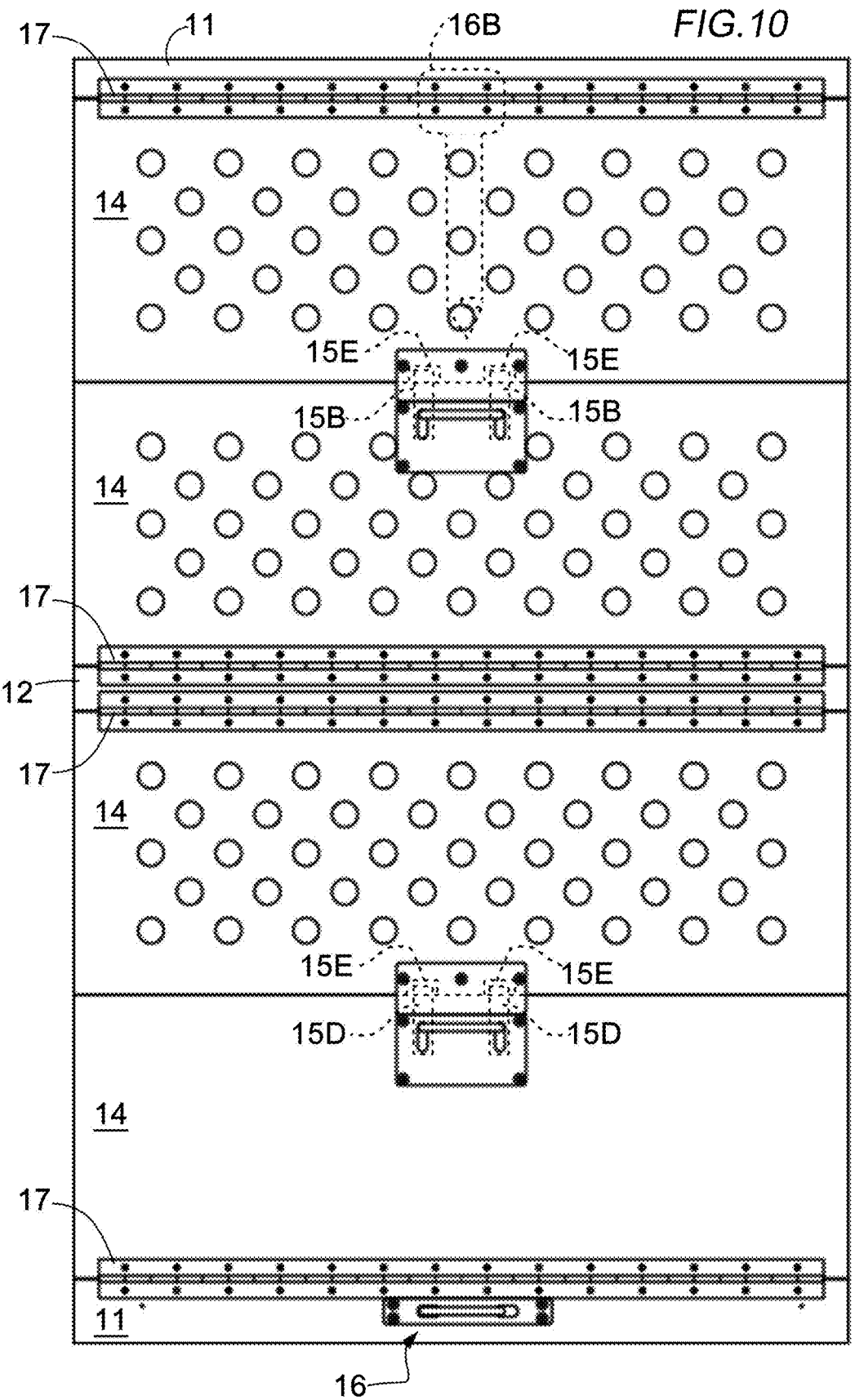
FIG. 10 is a top plan view of the example collapsible kennel in a fully expanded configuration.
Figure 11:
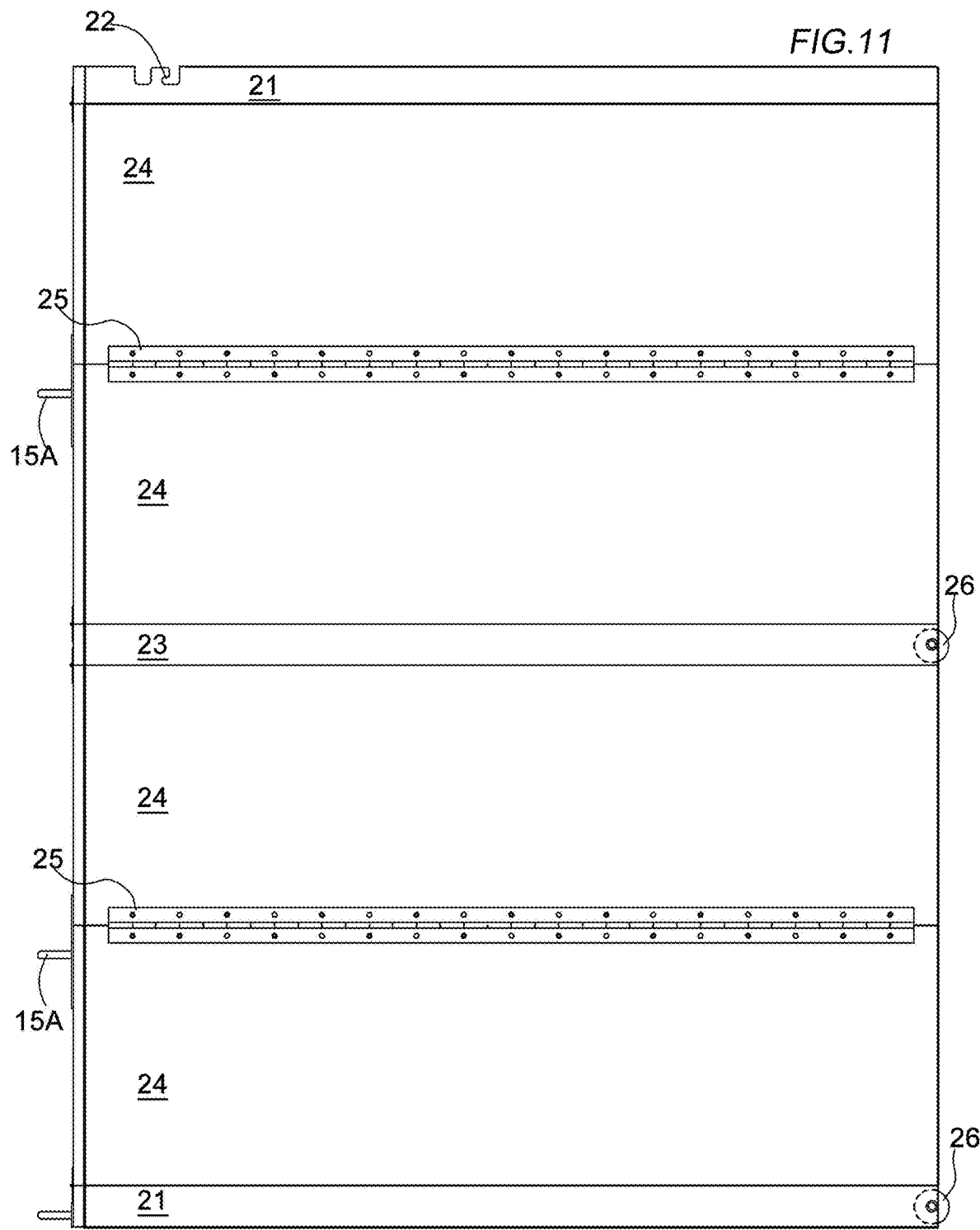
FIG. 11 is a side view thereof.

FIG. 3 best shows the folding arrangement of the kennel in a transitional state between collapsed and fully expanded. Side panels (24) are folded inwardly, and the top panels are folded outwardly. Side Panels are comprised of movable (24), floating (23) and fixed (21) flat panels connected together by piano type hinges or other suitable hinging members to form the left and right sides of the animal enclosure. Movable side panels (24) are connected to fixed side panels (21) and floating side panels (23) via side hinge members (25). Rearmost fixed side panels (21) have a profile (22) shaped to receive portions of an upper track/rail mount (22A) which serves as an anchor point to secure the kennel to a vertical surface; e.g., wall. Multiple kennels may be mounted side-by-side for maximizing space (FIGS. 6, 7). A bottom edge of rear panel (30) may engage with a lower mounting bracket (32) or track/rail, and thereby secure the collapsible kennel at its bottom end to a vertical surface.

Figure 5:
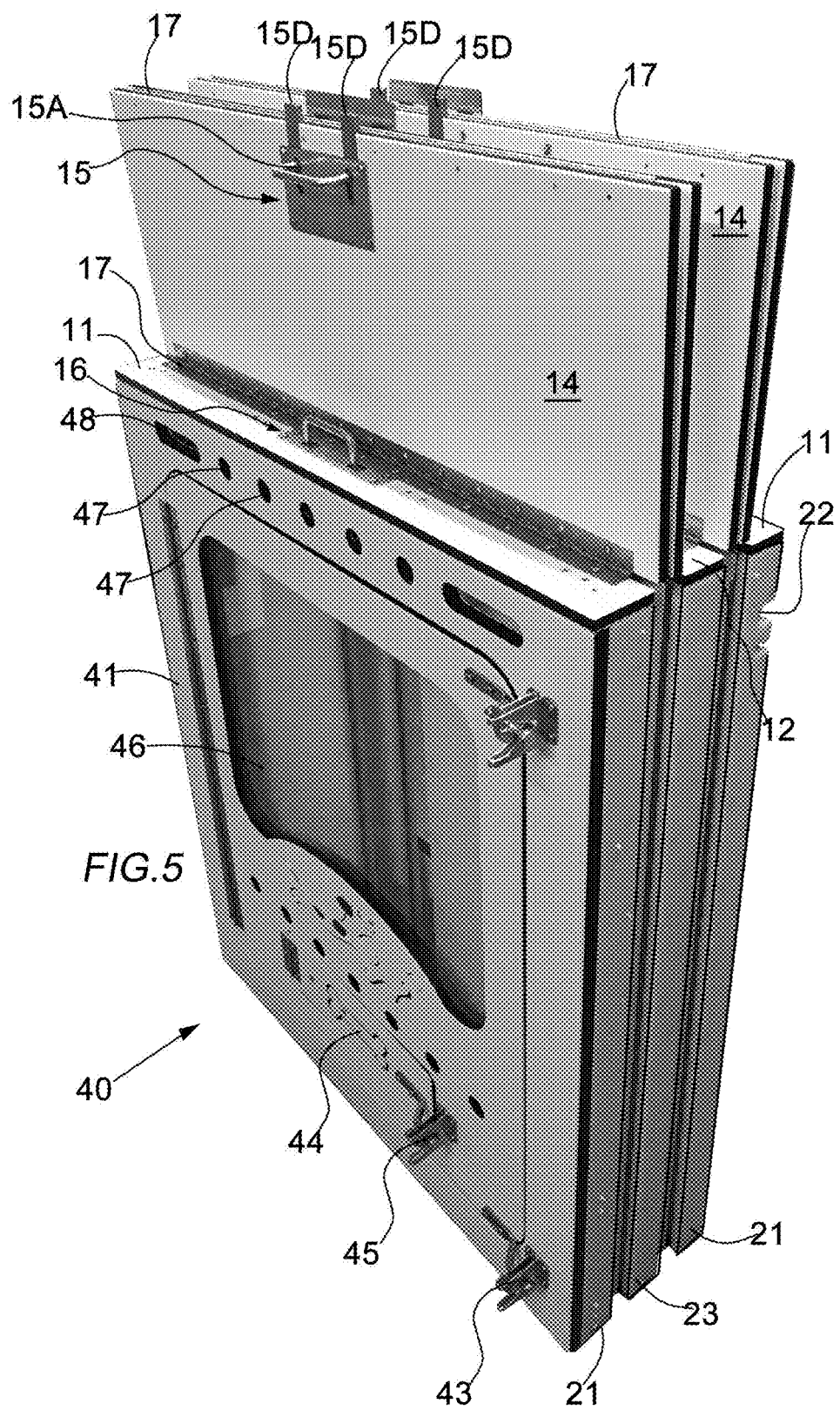
FIG. 5 is a perspective view thereof showing the example collapsible kennel secured in a fully collapsed configuration.
Figure 13:
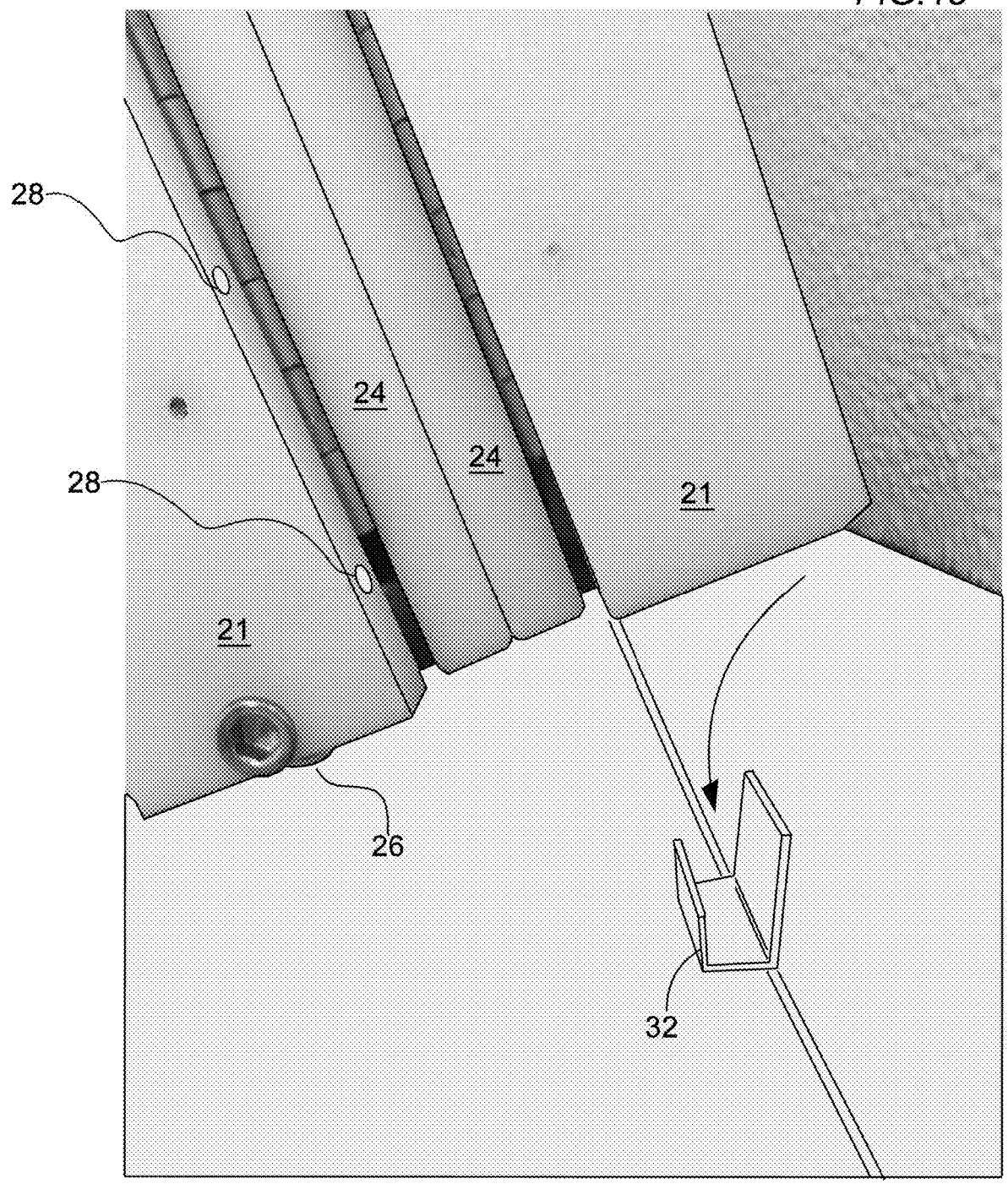
FIG. 13 is an enlarged partial view showing a bottom side of a collapsed kennel prior to engagement with a lower mounting bracket (32)

FIG. 5 best shows the kennel in a fully collapsed state. Small diameter, low profile wheels (26) are affixed to the bottom edges of side panels (21, 23) (FIG. 11) to support the weight of the kennel and aid in transition between expanded and collapsed states of the kennel. Left and right side panels (21, 23, 24) of the collapsible kennel mirror one another. Optional panel brace members (27) (FIGS. 14, 15) may be leaf springs shaped as shown or other biasing members enabling the side panels to remain substantially planar with respect to one another when the kennel is fully expanded.
Description of the Rear Panel Rear Panel (30) is a stationary flat panel of pet safe material that forms the rear of the collapsible kennel and serves as an anchor point for the kennel. Rear panel (30) spans the width and height of the kennel and includes a bottom edge adapted to engage a lower wall mounted bracket (32) (FIG. 13).
Description of the Front Panel Front Panel (40) is a flat panel of pet safe material that includes a frame (41) a door (42), a window (46) and a feeding door (44). Panel (40) serves as the front of the collapsible kennel as well as the animal entry and exit point. Front panel (40) spans the width and height of the kennel. Front panel frame (41) and front door (42) are joined to parts of a front door latch (43) to secure the door. Front door (42) includes a window (46) and a smaller feeding door (44) sized to allow the passing through of feed bowls. Front door (42) and feeding door (44) are connected to the feeding door latch (45) which latches the feeding door closed. Hand holds (48) are formed in front panel frame (41) and assist in expanding the kennel. Ventilation holes (47) are made into the front panel to allow air flow for animal comfort.

Rearmost fixed top panel (11) and fixed side panels (21) are affixed to the rear panel (30), and serve as anchor points for the entire kennel by way of bottom and rear side edges or molding (22) adapted to engage a bracket (32) or wall track (22A). Panels (21) and (23) may include wheels (26) on their bottom edges. Side panels (21) are affixed to the front frame. Movable side panel pairs (24, 24) are connected vertically and lengthwise by way of side hinges (25). One pair of movable panels (24) is connected between the rear most fixed side panel (21) and the middle floating side panel (23) by side hinges (25) on the left and right sides of the structure. Another pair of movable panels (24) is connected between the middle floating side panel (23) and the front fixed side panel (21) at the left and right sides of the structure. Top movable panel pairs (14, 14) are connected by way of top hinges (17). One pair is connected between the rear most fixed top panel (11) and the middle floating top panel (12) by hinge (17). Another pair is connected between the middle floating top panel (12) and the frontmost fixed top panel (11). Front door (42) is hinged to the front panel frame (41) by a door hinge and held closed by latches (43). Feeding door (44) is inset within and hingeably connected to the front door by means of spring loaded hinges and held closed by a latch. Window (46), made of impact resistant plastic, is affixed to the front door.

In the collapsed state the lower rail mounting portion of the kennel easily engages the lower rail mount when tipped or rocked into place. The collapsible kennel is then lifted slightly and lowered to engage the upper wall rail mounting portion with upper mounting rail securely affixing the kennel to the wall. Releasing the front lock and pulling lightly on the front hand holds of the kennel causes the front panel to move laterally away from the rear panel and expand in accordion fashion away from the wall. As the floating top panels begin to move laterally away from the rear top panel, the hinged top panels begin to cantilever against the fixed and floating top panels. The weight of the movable top panels (14) create a lateral force between the fixed and floating top panels causing them to expand. The frontmost floating top panel and subsequently the front panel move outward away from the wall. As the hinged top panels transition from vertical to horizontal in the expansion, spring loaded extended bolts (15D) in the top panel locks (15) begin to engage mating channels/recesses (15E) in the opposing hinged top panels. Once the top panels are fully horizontal, the spring loaded bolts (15D) become fully engaged with mating channels/recesses (15E) in the opposing hinged top panels and securely lock the top panels and subsequently the kennel in the expanded state.

While the movable top panels (14) are transitioning from the upright vertical position to the floating side panels affixed to floating top panels move laterally away from the rear fixed panels (30) and subsequently the wall. Low profile wheels attached to the bottom of the floating side panels carry the weight of the kennel and allow it to roll along the floor smoothly outward as the kennel expands. As the construction expands, floating side panels (23) pull on movable side panels (24) causing them to fold outward and expand. The frontmost floating side panel (23) affixed to the front panel (40) moves laterally outward with the front panel away from the wall.

When the kennel is fully expanded the top panels are locked rigidly horizontal by locks (15) and front floating panel wheels (26) carry weight of the front of the kennel to the floor. In the fully expanded state the rear panels cannot lift, rock or tip out of the upper or lower wall tracks due to the relationship to one another thus keeping the kennel securely fixed to the wall and inescapable by dogs.

In the fully expanded state the front door (42) may open to allow the entry of an animal and then latch closed to contain the animal. Frontmost movable top panel (14) may be used as a food preparation surface. Feeding door (44) may open to allow the passing through of a bowl containing food, water or medications for the animal inside. Typically, the feeding door is opened to remove the feeding bowl and the front door is opened to lead the animal out.

Releasing the front lock and pulling gently up on the top panel causes the opposing hinged top panels to begin to move upward toward one another. Gently pushing on the front panel (40) and subsequently the frontmost top floating panel to which it is affixed, causes the top movable panels (24) to heave up toward one another transitioning to vertical. The frontmost floating side panel (23) which is affixed to the front panel transfers the force applied to the front panel to the movable side panels (24) causing them to heave inward and subsequently fold away. Accordingly, as an operating principle, top movable panels (14) which are folded outwardly when the kennel is in a collapsed state, provide mass by which the structure is biased to spontaneously transition from an unsecured collapsed state an expanded state; gravity forcing the fixed panels (11) away from each other; the effect of which is to greatly reduce the pulling force required to expand the structure away from a wall to which the structure is attached.

Releasing the rear most lock (15) and pulling gently up causes the opposing hinged top panels (14) to begin to move upward toward one another. Gently pushing on the front panel (40) and subsequently the middle top floating panel (12) causes the movable top panels (14) to heave up toward one another transitioning to vertical. The middle floating side panel (23) which is affixed to the front panel (40) transfers the force applied from the front panel to the movable side panels (24) causing them to heave inward and subsequently fold away. In some implementations, one or more small stops or bumpers (28) may be placed in the hinge stile (29) between the side hinged panels (FIG. 2A) in order to bias the panels to collapse readily when (1) the securing latch (16) is released and (2) the front panel is gently pushed. Alternately, the edges of panels (14) facing the hinge stile (29) may have a groove routed longitudinally and a rubber bead strip placed therein to prevent the edges from flush contact.

Figure 14:
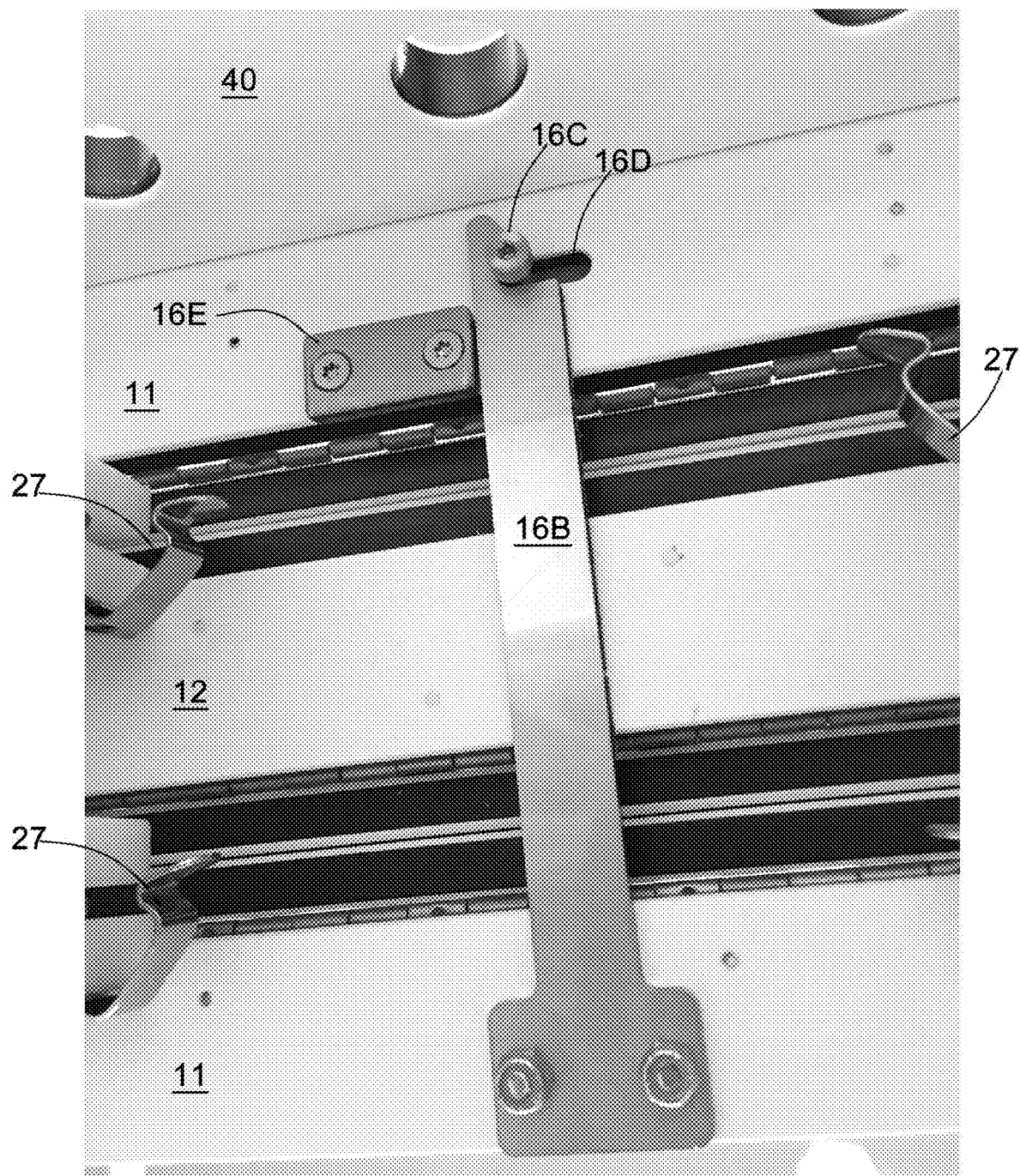
FIG. 14 is an interior view of the collapsible kennel showing the underside of the top panel assembly (10) in a collapsed and secured configuration with latch (16B) engaged with pin (16C)
Figure 15:
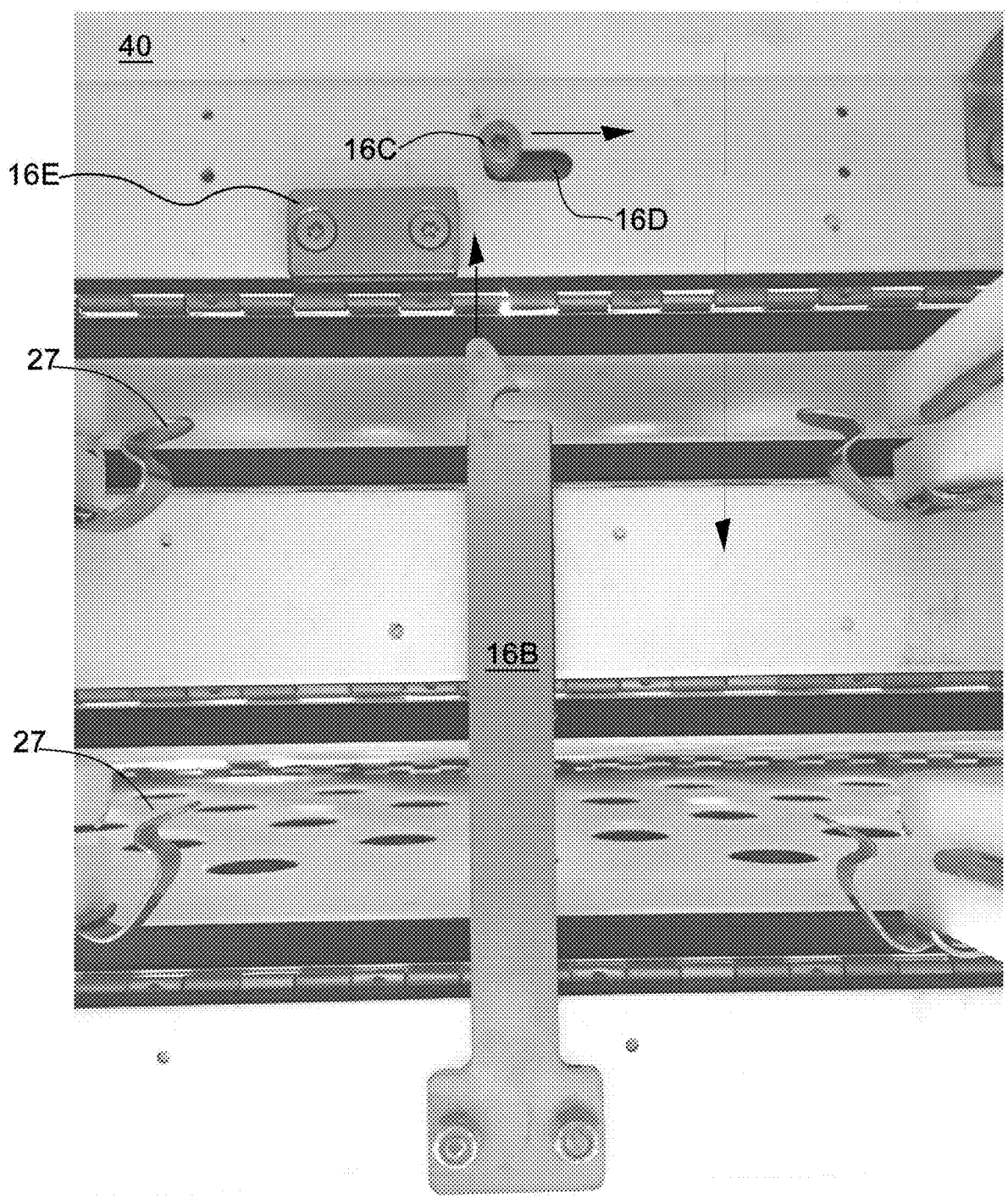
FIG. 15 is another interior view of kennel being transitioned from an expanded position to a collapsed position.

As best shown in (FIG. 15) which is a under side view of the top panel assembly, when collapsing the kennel, front panel (40) when pushed in the direction of the arrow as indicated, forces pin (16C) in the direction of latch (16B). When the tapered end of latch (16B) is forced to abut guide plate (16E), spring loaded pin (16C) is momentarily deflected and then comes to rest in the notch of the tapered end and locks the kennel in the collapsed position (FIG. 14). Once the kennel is locked in the fully collapsed state the space that was occupied by the expanded kennel may be repurposed.

Moving to FIG. 16, the fully collapsed kennel secured in the collapsed state can be easily removed from the wall track/rail (FIGS. 8, 9), by gently lifting upward on the collapsed kennel, pulling on the hand holds and thereby pulling the top away from the wall and the upper wall track mounts free of the the upper wall track. In addition to the wall track 22A, a lower mounting bracket (32) (FIG. 13) may be adapted to mate with a lower end of the kennel. By tipping or rocking the collapsed kennel outward away from the wall, the kennel is unmounted, and hence can be moved elsewhere in the facility, typically by rolling, for thorough cleaning inside and out.

To expand the kennel, handle (16A) is slidably actuated within slot (16D) which disengages pin (16C) from latch (16B). Elsewhere on the kennel mating parts; e.g., plates (15B), slots (15C), slidable bolts (15D) and recesses (15E) of the lock mechanisms (15) slide automatically into engagement, and maintain the kennel in the expanded state the the top panels in a planar arrangement.

Even when the kennel is unattached from the wall track, it may be expanded for cleaning. Releasing the collapsed position lock (16) and pulling gently on the front panel (40) expands the kennel in the same manner as when affixed to the wall. Rear most fixed top and side panels become floating panels causing the front and rear panels to move laterally away from one another. Likewise, the unattached kennel is collapsible as when affixed to the wall.

Various implementations according to the present invention may be include a greater or lesser number of side and top panels by decreasing or increasing the widths of movable panels at the top, right and left sides of the kennel. Accordingly, in some implementations some floating side panels may be eliminated and thereby reduce the number of overall side panels needed for operation of the kennel. Example implementations of the present invention may be used as an enclosure for any animal when scaled accordingly.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention in which all terms are meant in their broadest, reasonable sense unless otherwise indicated. Any headings utilized within the description are for convenience only and have no legal or limiting effect.

What is claimed is:

1. An animal kennel comprising:
   a collapsible and expandable structure including a top side, a left side, a right side and a back side, a door and a food passageway;
   the top side, left side, right side and back side each include one or more hinged panels that are configured to fold outwardly or inwardly;
   at least one attachment member configured for releasable attachment of the structure to and from an adjacent surface;
   a latch for securing the kennel in a collapsed state;
   at least one spring loaded lock adapted to automatically secure the kennel in an expanded state;
   the one or more hinged panels including a subset of side panels, the side panels including bottom edges with low profile wheels;
   the one or more hinged panels including a subset of top panels configured to fold outwardly relative to the structure when the structure is in the collapsed state and which define a biasing mass for spontaneous expansion of the structure into the expanded state when the latch is released, wherein the low profile wheels are adapted to move across a floor surface and the structure includes a bottomless opening in the expanded state.

2. The animal kennel according to claim 1, the subset of side panels including fixed side panels, floating side panels and movable side panels.

3. The animal kennel according to claim 1 configured to attach along its right side and left side to an adjacent animal kennel of same configuration.

4. The animal kennel according to claim 1, including the at least one attachment member adapted to attach the back side of the structure to a vertical surface.

5. The animal kennel according to claim 1, the structure biased to expand unless constrained by the latch.

\* \* \* \* \*